April 7, 1970   OLE-BENDT RASMUSSEN   3,505,162
FILAMENTARY OR SHEET-LIKE MATERIAL OF POLYMERIC SUBSTANCES
Filed June 7, 1966   8 Sheets-Sheet 1

INVENTOR
OLE-BENDT RASMUSSEN

BY Sol Shappirio

ATTORNEY

INVENTOR
OLE-BENDT RASMUSSEN

BY Sol Shappirio
ATTORNEY

April 7, 1970     OLE-BENDT RASMUSSEN     3,505,162
FILAMENTARY OR SHEET-LIKE MATERIAL OF POLYMERIC SUBSTANCES
Filed June 7, 1966     8 Sheets-Sheet 5

INVENTOR
OLE-BENDT RASMUSSEN
BY Sol Shappirio
ATTORNEY

United States Patent Office 3,505,162
Patented Apr. 7, 1970

3,505,162
FILAMENTARY OR SHEET-LIKE MATERIAL OF POLYMERIC SUBSTANCES
Ole-Bendt Rasmussen, 28 Rugmarken, Farum, Denmark
Filed June 7, 1966, Ser. No. 555,835
Claims priority, application Great Britain, June 8, 1965, 24,068/65
Int. Cl. B29f *3/01;* D04h *1/58*
U.S. Cl. 161—168                                                    15 Claims

ABSTRACT OF THE DISCLOSURE

An extruded generally fibrous appearing structure in the shape of a filament or sheet which is formed of a coherent assembly of a large number of shreds of at least one synthetic polymer, each shred being characterized by a spine having a length substantially greater than either or both of its width or thickness and a width extending through a substantial part of the structure thickness, and a plurality of tentacles integral with the spine, the tentacles extending outwardly from at least one corresponding side of the spine and being collected together into at least one layer on a surface of the structure in which layer the tentacles of adjacent spines are generally interlaced together.

---

In the past it has apparently always been assumed that one can only produce materials having the characteristics necessary of textiles by building these materials up from small elements which are generally fibers or threads. I have now found that it is not necessary to start from these small elements in order to obtain a textile material.

This invention relates to a class of materials that have a wide variety of uses. The materials according to the invention may be used as textiles, for example as clothing. Other materials may be used as carpeting. Yet other materials may be used as packaging, yet others may be used as building boards while yet others may be leather-like. The materials according to the invention may be sheet-like or filamentary. If filamentary they may subsequently be formed into any of the products that can be formed from more usual types of filaments.

A filamentary or sheet-like material according to the invention is formed of particles of synthetic polymeric material and each having a spine and a plurality of tentacles which are of the same materials as the spine and are drawn out from the spine and which lie substantially along a flat dimension of the sheet-like material or along the length of the filamentary material, the particles being held together by the tentacles from one particle bonding with adjacent particles.

A convenient method of making the sheet-like or filamentary material according to the invention comprises forming by extrusion fluid or semi-fluid substantially lamellae shaped particles of polymeric material separated by a second fluid or semi-fluid component and arranged in a thin structure, drawing tentacles out from the particles and bonding the tentacles from one particle with other particles to form the shape of the desired filamentary or sheet-like material, setting the polymeric material of the particles and destroying the continuous structure of the second component.

The particles in the filamentary or sheet-like materials according to the invention may have one of a variety of shapes. The tentacles may be drawn out from the sides of the spines of the particles or they may extend from central parts of the spine.

The basic idea behind the invention is the drawing out from particles of synthetic material of tentacles that are subsequently used to bond the filamentary or sheet-like materials together. Depending upon the shape of the initial particles and upon the extent to which tentacles are drawn out from the particles and upon the places on the particles from which the tentacles are drawn out so will the shape of the spine of each particle be determined. Often the spines are lamellae, that is to say the thickness of each is substantially less than either of its other dimensions. However, it often happens that one may draw out from the particles tentacles to such an extent that one can no longer consider the spines as lamellae shaped but they may instead be rod shaped. Thus the spines may have two of their dimensions similar and the third dimension much greater than the other two. Whatever the basic shape of the spines the spines generally will not be arranged linearally in the material. For example, lamellae may be arranged so that they have a saddle shape and rod shaped spines may be folded back on themselves.

The accompanying drawings serve to assist understanding of the invention. In these drawings:

FIGURE 12 is a view of apparatus suitable for making materials according to the invention while FIGURE 13 is a section on the line XIII—XIII of FIGURE 12

Figure 1:
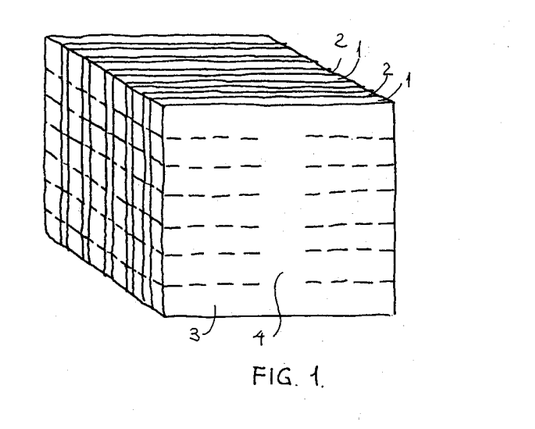
FIGURE 1 is a diagrammatic representation of a series of substantially lamellae shaped particles separated by a second component.
Figure 2:
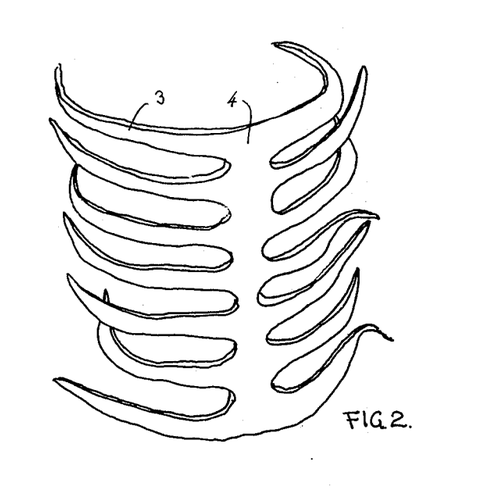
FIGURES 2, 3, 4, 5, 6 and 7 are diagrammatic representations of particles of which materials according to the invention may be composed.

In the theoretical situation illustrated in FIGURE 1 lamellae shaped particles 1 are separated from one another by layers 2 of a second component, the whole system being in the fluid or semi-fluid state. The layers 1 can then be sub-divided along the dotted line shown to yield tentacles 3 separated from one another but all attached to a central spine 4. Thus on splitting out the tentacles a product such as that shown in FIGURE 2 may be obtained. Depending upon the extent to which the tentacles 3 are drawn out so the spine 4 will either be more or less cylindrical or will still be lamellae shaped.

Figures 3, 4, 5:
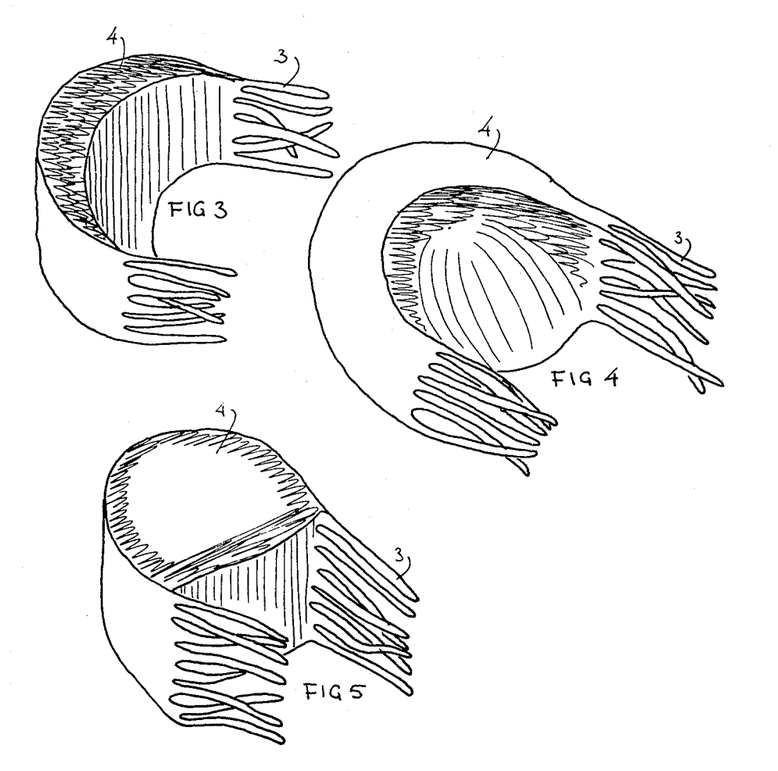
Figure 6:
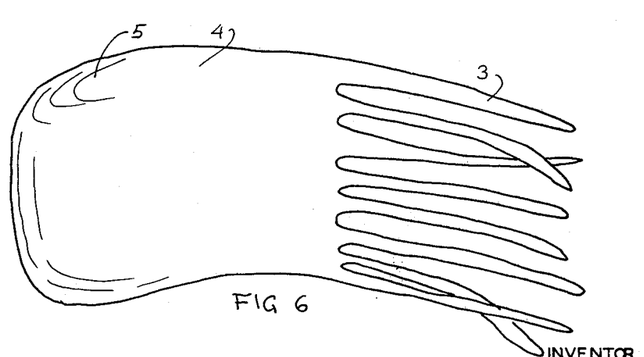

Depending upon the conditons under which the initial particles are extruded and the tentacles are drawn out from the particles so the shape of the particles in the materials according to the invention may be controlled. As shown in FIGURE 3 the particles may have their spines 4 saddle shaped, having tentacles 3 extending from both edges of the spines. Again, the spines 4 may be cup shaped, as shown in FIGURE 4, or they may be cylindrical or semi-cylindrical, as shown in FIGURE 5. It should be appreciated that in reality the particles illustrated in FIGURES 3 to 5 will not have flat upper edges, as shown, but will instead be tapered. The tentacles may be drawn out of only one side of a spine, as shown in FIGURE 6. The particle shown here is a slightly curved flake shaped particle.

When the spines are lamellae shaped they will be substantially arranged transverse to the flat dimension of the sheet. The sheet and lamellae shaped particles do not of course have to be wholly flat and where I refer to the flat dimension I refer to the flat dimension at any particular point under consideration. Thus if at any one point the sheet under consideration is curved I consider the flat dimension as being the dimension along the tangent to that sheet. By saying that the lamellae are substantially arranged transverse to the flat dimension of the sheet I mean that the lamellae do not lay wholly within the plane of the sheet but do cross the sheet to some extent at least. Thus the flake shown in FIGURE 6 may span the thickness of a sheet 6, even though the flake is laying out almost flat. Thus its upper edge 5 may be at one suface of the sheet while its tentacles 3 are at the opposite surface of the sheet.

Figure 7:
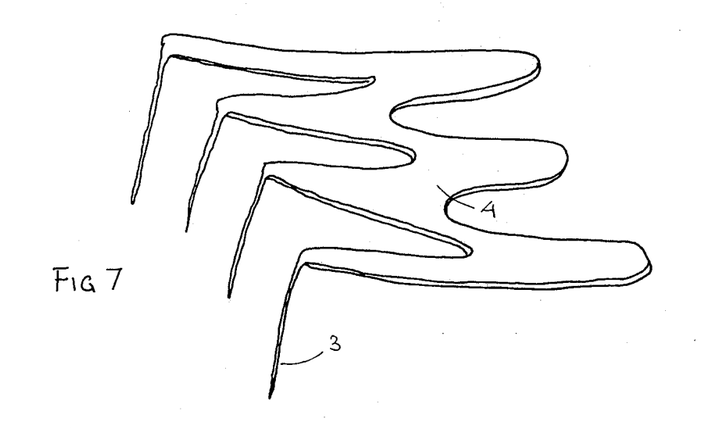

I have mentioned that the spines of the particle may, for example, be folded back on themselves in the material, but it is also readily possible to generate particles in which the spines are inherently nonlinear. Such a particle is shown in FIGURE 7. In this the spine 4 is indented and tentacles 3 are drawn out from the projections. This spine illustrated may, however, still be considered to be substantially lamellae shaped as its overall breadth and length are both generally considerably greater than its thickness.

The spines may be short, having a length of, for example, only sufficient to span the thickness of the material or filament. Their length need not be controlled by the thickness of the sheet since short segments do not have to be arranged transverse to the thickness of the sheet. Thus, for example, they may be arranged end to end in substantially parallel rows. The length of the short spines may be, for example, only a few millimetres or up to about 1 centimetre. Short spine having greater lengths are, however, sometimes used. In contrast to short spines materials may be made in which the spines are elongated. Thus these spines may be substantially endless and may pass right across the width of the sheet material. The spines when elongated are generally arranged substantially parallel to one another each with its length substantially in a flat dimension of the sheet. However, whether these spines are elongated and parallel to one another or short and arranged end to end in parallel rows the rows or spines do not have to be linear and in fact it is often preferred to arrange them in zig-zag fashion, when viewing the material from one surface.

Figure 8:
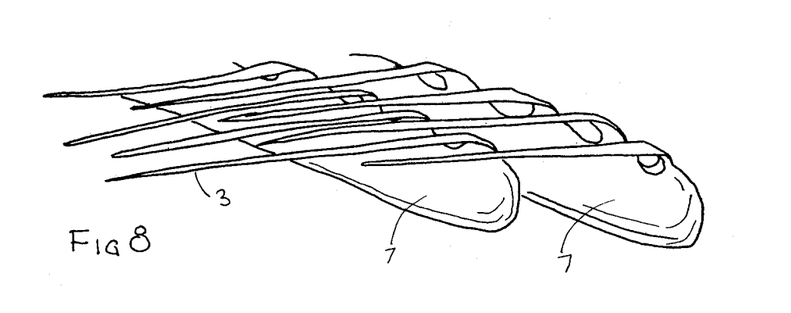
FIGURE 8 is a diagrammatic representation showing one material in which the tentacles extend from the side of lamellae.

Whatever the particular arrangement of particles, although it is sometimes preferred that there should be tentacles laying along both surfaces of the material it is often preferred that substantially all the tentacles should lie along one surface only of the sheet material. In FIGURE 8 there is shown part of such a sheet material composed of a number of elongated lamellae 7 and from which are drawn, on one surface of the material only, tentacles 3. These tentacles are bonded together and thereby hold the lamellae 7 in position parallel to one another.

Figure 9:
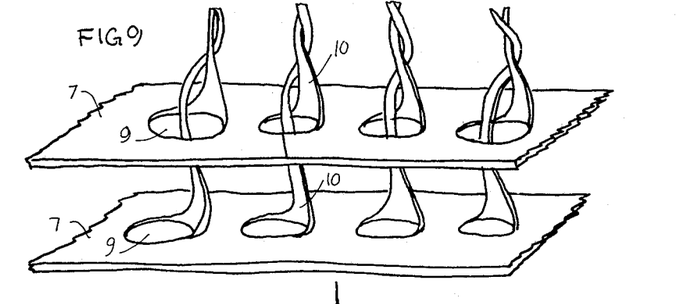
FIGURES 9 and 10 are diagrammatic representations of materials in which tentacles extend from central parts of lamellae.
Figure 10:
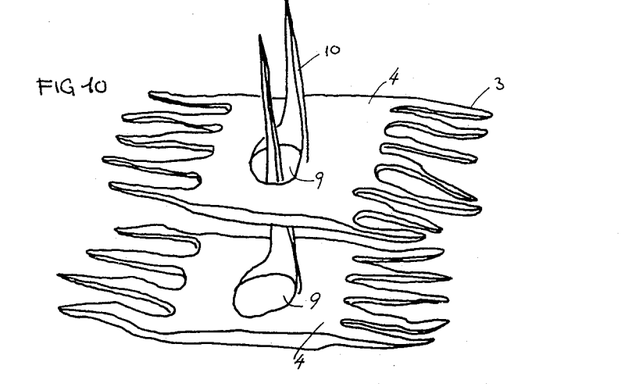

Tentacles do not have to extend from side parts of lamellae or spines but instead may extend from central parts of lamellae through holes in adjacent lamellae in order to bond one particle with adjacent particles. Although this arrangement of tentacles is of value with a variety of arrangements and types of particles there are two materials in which it is of particular value. One is when the spines are elongated lamellae substantially parallel to one another. A part of such a material is shown in FIGURE 9. Two elongated lamellae 7 are shown each having a series of holes 9 punched in it and having tentacles 10 extending from central parts of other lamellae through these holes. It will be seen that the tentacles 10 themselves are drawn out from the spines at the positions of the holes 9. The other preferred material is that in which the spines are short lamellae and are arranged substantially end to end in substantially parallel rows. Part of a sheet is shown in FIGURE 10, in which only one segment 4 in two parallel rows is shown. As in the material shown in FIGURE 9 the rows are held together by tentacles 10 extending through holes 9 in adjacent lamellae 4. In this material, however, adjacent lamellate within the rows are held together by the bonding together of the tentacles 3 extending from the sides of the lamellae with the corresponding tentacles in adjacent lamellae in the rows. It will be understood from this that in this modification there must always be at least three tentacles in each segment one of which tentacles is extending through a hole in the adjacent segment. Preferably, however, the number of tentacles in each segment is greater than three.

As is shown in FIGURES 9 and 10 the tentacles passing through the holes in adjacent lamellae are preferably twisted with one another in order to improve the bonding. Whether or not they are twisted it is necessary that the tentacles should extend through several adjacent lamellae if the rows are to be held together solely by virtue of this type of bonding. Thus, in general, the tentacles will pass through at least three lamellae, so that each lamellae has three tentacles passing through it, and often they pass through more.

Figure 11:
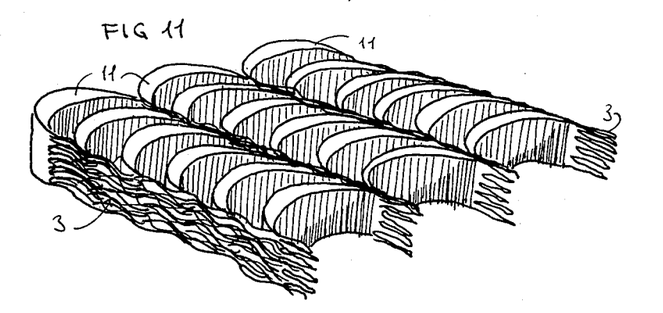
FIGURE 11 is a diagrammatic representation of a material made up of parallel rows of saddle shaped segments.

The spines of the particles, when short, may be arranged in substantially parallel rows with the spines transverse to the rows. FIGURE 11 shows such a material, although for the sake of clarity the spines are shown as having flat upper surfaces, whereas in practice they will not obtain these surfaces unless some suitable cutting or other treatment is applied to them after they are formed into the material. The material shown in FIGURE 11 consists of substantially saddle shaped segments arranged with the saddles 11 transverse to the rows and each segment is held to adjacent segments in the same row and to those in adjacent rows by the bonding together of tentacles 3.

Figure 22:
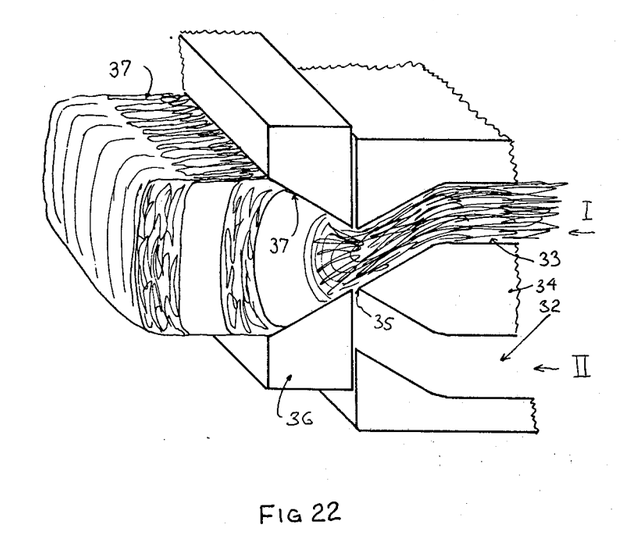
FIGURE 22 is a section through apparatus suitable for making filaments or sheet materials.

Yet another type of material according to the invention consists simply of a single row of particles, arranged with the spines of the particles transverse to the length of the row. This material may be filamentary, the spines necessarily then being extremely short. Also it may be in the form of sheet-like material in which case each spine may lay in a substantially straight line and span the distance from one edge of the sheet to the other. For this material the spines have to be elongated, being at least as long as the distance between the edges of the sheet. Thus this sheet material may be in the form of narrow ribbons or the broad sheets. The formation of such a sheet material is shown in FIGURE 22, and is described in more detail below.

The tentacles drawn out from the spines of the particles of the materials according to the invention are most usually fiber-like, and part of the bonding at least generally results from the felting together of the fiber-like tentacles with one another. However, in addition to this felting, or instead of this felting, there may also be bonding from the use of a suitable bonding agent. This bonding agent or some other material that is present between adjacent particles (i.e. formed or split material as described in more detail below) may also assist in the holding together of the particles. In general, however, the tentacles are always such that the particles can be held together by them, with or without bonding agent, and that any bonding resulting from material between adjacent particles and not associated with the tentacles merely serves to increase the strength of the product still further.

In order that the sheet material shall be held together it is essential that sufficient tentacles be drawn out from each particle. Satisfactory bonding will not occur if there is just one tentacle drawn out from each side of each spine or if just two tentacles extend from central parts of adjacent lamellae shaped spines. Instead, there must be a plurality of tentacles from each spine, that is to say there must be at least three tentacles from each spine. As is shown in the drawings there are generally many more than this, especially when the tentacles are drawn out from the sides of the spines rather than the centers.

Methods of extruding fluid or semi-fluid substantially lamellae shaped particles of polymeric material separated by a second fluid or semi-fluid component are known and are described in my copending U.S. patent application Ser. No. 391,997 filed Aug. 25, 1964. The basic process generally comprises the use of a body in which there is a row of adjacent parallel ducts and means for supplying one molten material to alternate ducts and a second component to the remaining ducts in the row. The body is so shaped that the extruded material is in the form of a thin structure. In the process of the present invention it is generally preferred to extrude the lamellae through a row of ducts as continuous lamellae. The row may be circular and the lamellate, after extrusion, rotated relative to the row in order that the lamellae become arranged helically into a cylindrical sheet. This sheet may then be slit along its length to provide a flat sheet. In another method the row of orifices is straight and the lamellae shaped particles are extruded as continuous lamellae in a flat sheet and are then folded back over one another, thereby becoming arranged in zigzag fashion. Whatever the method of extrusion the continuous lamellae may subsequently be cut into short lengths before the tentacles are drawn out from them.

The arrangement of the lamellae after extrusion into the desired pattern in the sheet material is usually effected by subjecting the lamellae to a suitable lateral shear. Thus, they may be extruded through the ducts into a chamber in which they are under pressure from one or more surfaces that move relative to the ducts to provide the desired shear. Thus if the row of ducts is circular the one or more surfaces may rotate relative to the ducts while if the row is linear then the one or more surfaces may reciprocate relative to the ducts, thus dragging the lamellae into a zigzag pattern.

When the tenacles are to be drawn out from a side of each originally lamellae shaped particle it is preferred to carry out the drawing in at least two operations. If the particles, even though they are still fluid, are merely dragged against a comb then it is not readily possible to form tentacles that give really satisfactory bonding. Instead, it is preferred to drag the side, or sides, of the lamellae from which the tentacles are to be drawn under pressure against a serrated edge and then to drag the serrated surface so formed under pressure against a knife edge. This knife edge may be straight. The purpose of this second drawing step is to draw a tentacle out from the starting points provided by the first step, and so a comb is not required for the second step. If, as in some constructions, it is preferred or necessary that the edge used for the second drawing step should be serrated it should be constructed and used in such a manner that as far as possible the parts of the serrated surface to be drawn should come in contact with convex parts of the edge rather than concave. By carrying out the tentacle drawing in two stages more uniform tentacles and tentacles of greater length are obtained. The initial drawing against the serrated edge provides a serrated surface and the tentacles are subsequently drawn out from the ridges of this surface.

Figures 12, 13:
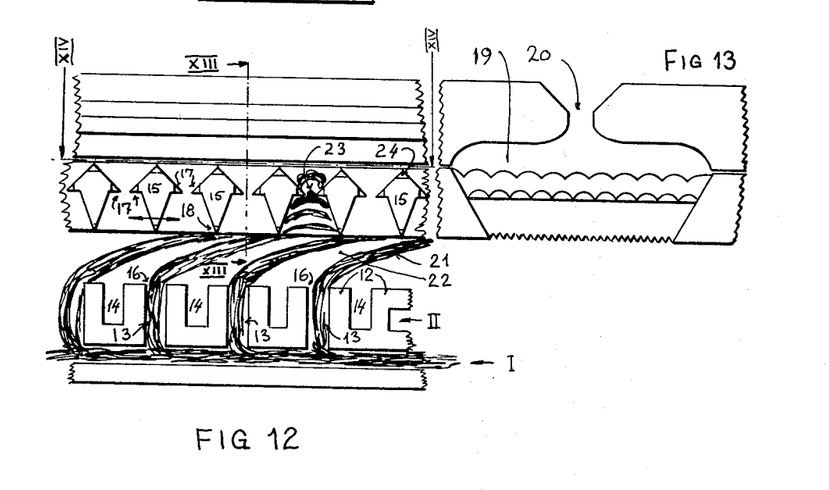
Figure 14:
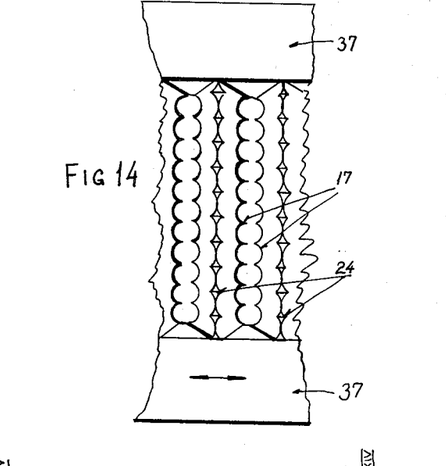
FIGURE 14 is a plan view of part of the apparatus shown on the line XIV—XIV of FIGURE 12.

A suitable apparatus for carrying out the process of the invention is shown in FIGURES 12 to 14 of the accompanying drawings. To the milling and sheet-forming device the two melted polymers I and II are applied by means of two extruders (not shown). I is used to form the segments of the fabric and II is the second component. In the drawing I is marked with shading lines, whereas II is not marked. From the extruders, I and II are pressed into the device through main channels and subsequently divided out on a series of very narrow ducts 13 and 14 separted by walls 12. Walls 12 separate ducts 13, through which the polymeric material I is extruded, from ducts 14 through which the second component II is extruded. There are means for supplying polymer I to ducts 13 and for supplying the second component II to ducts 14. The ducts 13 and 14 are shown here in simplified form, but are shown in greater detail in FIGURE 19. There is a series of similar wedges 15 spaced apart from the orifices 16 of the ducts, each being arranged with a corner edge 18 directed towards the orifices and the other two corner edges, 17, adjacent other wedges, being serrated. The whole assembly is within a narrow body, defined by walls 37, and this body also includes a hood shaped chamber 19 for receiving material extruded through the orifices and which has passed between the wedges, the chamber 19 facing towards the wedges and having an elongated outlet 20 spanning the length of the row of orifices relative to the orifices but these means are not shown in the drawings. They may result either in relative rotation or in relative reciprocation. Either the wedges or the ducts, or both, may be moved. The shear exerted by the edge 18 results in streams 21 of polymer I and streams 22 of second component II being dragged across the top of the orifices. When the wedges reciprocate, the streams 21 and 22 are dragged back and forth. As further material is forced out through the ducts 13 and 14 the streams are gradually forced up into contact with the edges 18 of the wedges and are chopped into short segments 23 by these edges. In order to assist in the dragging and chopping, or tearing, of the streams the edges 18 are preferably finely serrated. The teeth on the edges 18 may be, for example, 0.2 mm. apart. Preferably the distance between the edges 18 and the orifices 16 is greater than the distance between two adjacent ducts 13 but is preferably less than the width of each duct 13. When the wedges are reciprocating the ampltiude of the reciprocations should be many times greater than the distance between two adjacent ducts 13. The duration of half a reciprocation should preferably be about the same as the time taken for material extruded from an orifice 16 to reach the edge 18. The edges 17 are coarsely serrated and there may be, for example, about 1 millimetre between adjacent teeth.

The segments 23, some of which are shown in FIGURE 12, are forced up through the passage between adjacent wedges 23. This passage is of gradually decreasing width up to an overhanging neck, at which the width is substantially less than elsewhere along the length of the passage. In the apparatus illustrated both sides of each neck are defined by serrated edges 17, but if tentacles are only to be drawn out from one side it is sufficient for one side only to be serrated. The segments 23 are then forced up further, past the neck, and are then drawn under pressure against a reciprocating comb provided by the upper edge 24 of the wedges 15. This comb serves not only to draw out further the tentacles, the drawing of which was started by the serrated edges 17, but also to felt together the tentacles that are drawn out. The comb 24 reciprocates and so the segments are arranged in a zigzag manner in parallel rows, the segments in each row being in end to end relationship. The comb 24 is preferably arranged so that the ridges formed on the lamellae by contact with the serrated edge 17 come into contact with the ridges of the comb 24, rather than with the recesses. Thus the ridges should be about 1 millimetre apart.

The segments 23 drag against the wedge along either side of the passage formed between the two adjacent segments 15 and so become saddle shaped. If they drag also against the ends 25 of the passage between adjacent wedges then they will become cup shaped. In order to reduce this the length of the passage, as defined by the ends 25, is preferably increased gradually towards the neck 17, and also further, up to the comb 24. The reduction in width of the passage between each wedge up to the neck not only ensures that the segments engage with the edge 17 under pressure, but also produces a hang-up of material.

On passage through the chamber 19 and outlet 20 the segments 23, which by then have been felted together into rows, are forced into closer contact with one another and the bonding of the whole together is improved. In addition to moving the wedges or the ducts, both may move, or the hood may move, or all three may move.

The orifices 16 may be, for example, from 3 mm. to 2 cm,. generally about 8 mm., long, viewed as in FIGURE 13 and may be, for example, about 0.3 mm. wide, viewed from FIGURE 12. If the outlet 20 is suitably dimensioned with respect to the width of the chamber 19 at the combs 24 then the segments are turned through 90° during their passage through this chamber. The outlet must be substantially narrower than the length of the segments, viewed in the direction of FIGURE 13, for this to occur. A knife edge may be provided in the outlet with the result that the serrated surface or surfaces of the segments, resulting from contact with the comb 17, are dragged under pressure against this knife edge, tentacles thus being drawn out. In general, for a substantial number of the segments to be turned round, the outlet 20, viewed as in FIGURE 13, should have a width of from ⅓ to ¼ of the width of the widest part of the chamber 19. In practice generally some of the segments will be turned round and others will not, some felting together resulting from the action of the edge 24 and some from a knife edge in the outlet 20.

Figure 15:
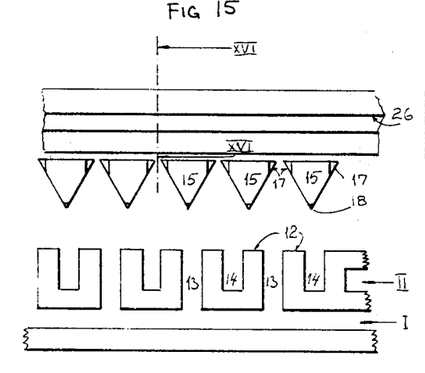
FIGURE 15 is a view similar to that of FIGURE 12 of a different apparatus and FIGURE 16 is a section on the line XVI—XVI in FIGURE 15.
Figure 16:
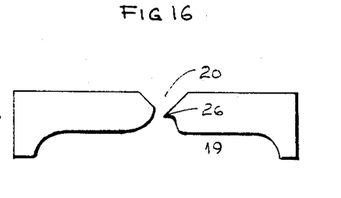

The apparatus shown in FIGURES 15 and 16 is similar to that shown in FIGURES 13 to 15 except that the upper edges 24 of the wedges 15 is missing. This apparatus is intended primarily for processes in which the dimensions of the outlet 20 are such that the segments are turned through 90° as they pass through and out of the chamber 19 and accordingly the outlet 20 is provided with a knife edge 26 to serve to draw out the tentacles.

Figure 21:
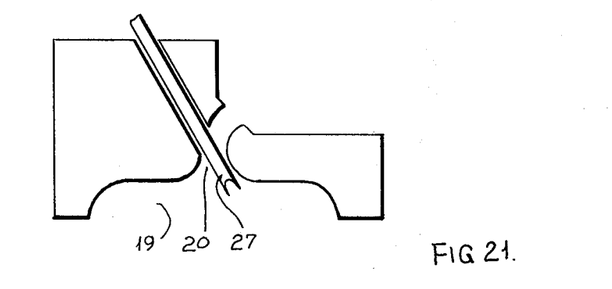
FIGURE 21 is a modification of the apparatus shown in FIGURE 16.

The apparatus shown in FIGURE 21 is a modification of that shown in FIGURE 16 as in this a barbed needle 27 is fitted to reciprocate within the outlet 20 so as to needle segments together as they pass through the outlet. The needle 27 is described in more detail below. This needle may have in addition to its stitching movement a rotary movement to produce twist of the tentacles. The stitching movement is rapid and preferably at times when the lateral movement of the fluid mass is comparatively slow. A similar needle arrangement may be provided in the outlet 20 shown in FIGURE 13. It will be appreciated that the needle punching results in tentacles being carried from one lamella particle through needle punched holes in adjacent particles.

Figure 17:
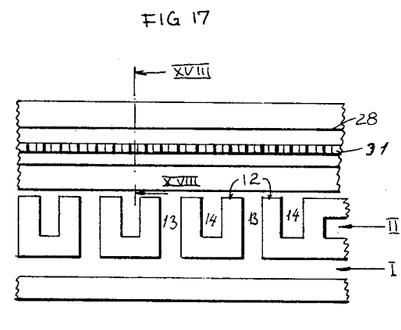
FIG. 17 is a view similar to that of FIGURE 12 of yet another apparatus.
Figure 18:
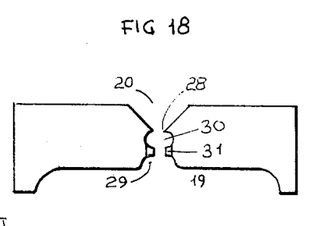
FIGURE 18 is a section on the line XVIII—XVIII of FIGURE 17.

In FIGURE 17 and 18 there is shown apparatus suitable for use in a process in which the lamellae are not cut into short segments. In this apparatus the wedges are omitted and the body comprises the ducts and a hood shaped chamber 19 directed towards the orifices of the ducts and having an elongated outlet 20 spanning the length of the row of ducts. The apparatus also includes means for moving the hood shaped chamber along the row of orifices relative to the orifices. To initate the drawing out of the tentacles there is a serrated edge 31 at the entrance to the outlet 20 and a straight knife edge 28 at the exit to the outlet by the edge 31. There may also be edges 31 and 28 on the opposite side of the outlet. The edge 31 is preferably set in a channel 29 in order that turbulence shall be at a minimum when the tentacles are drawn out. Again, there is preferably a pocket 30 between the edges 31 and 28, again to produce a hang-up of material. Instead of drawing tentacles out by contact with the edges 31 and 28, or in addition to this, the continuous lamellae may be needled together by needles reciprocating up and down through the ducts.

Figure 19:
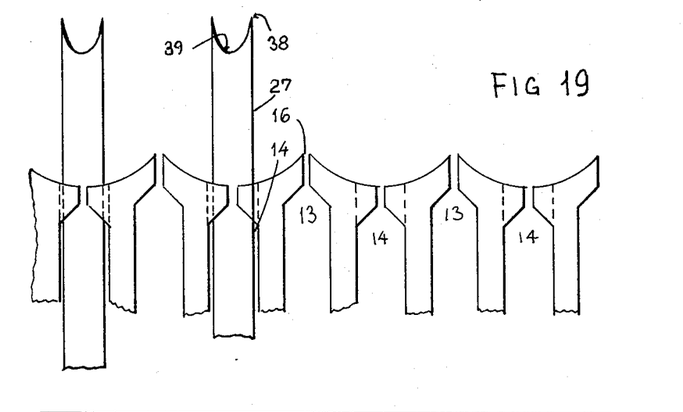
FIGURE 19 is a section through an arrangement of ducts suitable for extruding the polymeric material and second component in the method of the invention.
Figure 20:
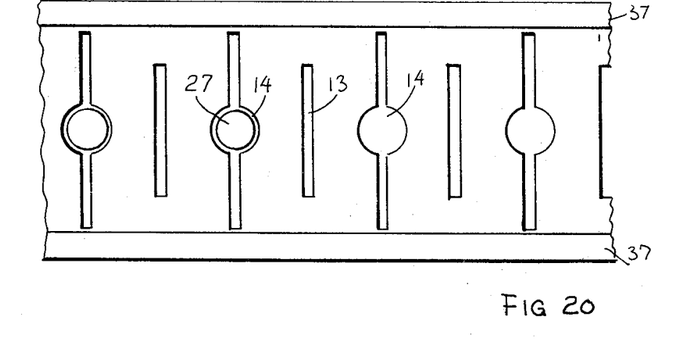
FIGURE 20 is a plan from above on the ducts shown in FIGURE 19.

A preferred arrangement of ducts is shown in FIGURES 19 and 20. Needles are shown only in one side. The orifices 16 of the ducts 13 from which the polymeric material of which the particles are to be composed is extruded are preferably raised above the orifices 16 of the ducts 14, from which the second component is extruded. As a result of this the carrying of the polymer streams extruded from the ducts 13 over the ducts 14 is facilitated. Preferably the orifices 16 both of ducts 13 and 14 are narrower than the main parts of the ducts. Preferably the ducts 14 are a little longer, when viewed from above, as in FIGURE 20, than are the ducts 13. The advantages of this is that the second component flows round the walls 37 of the body defining the whole apparatus and which encloses the polymer streams extruded from the ducts, and so acts as a lubricant between the polymer streams extruded from the ducts 13 and the walls. Preferably the distance apart of the ducts 13 is less than their width, as viewed from above. If a needle is to reciprocate through the ducts then it is preferably arranged within the ducts 14, as shown. The needles 27 generally have sharp leading edges 38 to punch holes and rounded trailing edges 39 to draw the tentacles out. Preferably the needles rotate in order to produce a twist of the tentacles. The stitching is carried out rapidly and preferably at times when the lateral movement of the mass is comparatively slight.

It is preferred that the component from which the particles are to be formed should have a higher melt viscosity than the second component. This has the advantage that the second component serves as a particularly satisfactory lubricant and also it facilitates the chopping and shaping of the particles of the polymer, since they are the more viscous. As an example, the polymeric material of which the particles are to be formed preferably has a melt viscosity of from 3 to 30 times the melt viscosity of the second component.

In FIGURE 22 there is shown an apparatus suitable for making sheet or filamentary material. It comprises a body including a pair of ducts 32 and 33 separated by a wall 34 having a serrated leading edge 35. There is a gate 36 slidable over the orifices of the ducts to open one orifice while closing the other. There are means (not shown) for reciprocating the gate over the orifices and means for supplying one polymeric material to duct 33 and the other component to duct 32. Thus, in this apparatus pulses of the polymeric material and the second component alternate with one another and a product is formed consisting of a single row of the pulses. By appropriately choosing the rate of extrusion and the rate of reciprocation of the gate pulses of any desired shape may be formed. Generally they will be substantially lamellae shaped. If the ducts and gate are short or circular then a filament is formed. As a result of the gate sliding over the serrated edge tenacles 37 are drawn out from the polymeric material by the sliding of the gate. In this apparatus the viscosity of the two fluid components may be similar or they may be different.

This method of reciprocating a gate over ducts may be applied to the production of sheet-like materials made up of a number of rows of segments. Thus, the polymeric material may be fed through a number of polymer ducts arranged in a row while feeding the second component through component ducts, repeatedly closing the polymer ducts while opening the component ducts and vice versa, thereby forming a sheet comprising parallel rows of saddle shaped segments of the polymeric material separated from one another by the second component, combing the edges of the segments and entangling the tentacles of adjacent segments together, setting the polymeric material of the segments and removing or splitting into fibres the second component. The opening and closing of the ducts may be effected by reciprocation of a series of triangular wedges, moving with their bases over the orifices to the ducts, and having a comb cut into their upper edge so as to serve to comb the edges of adjacent rows and entangle the tentacles thus drawn out together.

Both the polymeric material and the other component extruded with the polymeric material must be fluid or semi-fluid in order that they are extrudable. It is generally preferred that the polymeric material of which the particles are formed should be of quite a soft polymer in order to improve the properties of the final product, textile properties and the tear resistance at the junction of the tentacles with the spine being improved in particular. Suitable polymeric materials are polyamides, polyesters, polyurethanes, polypropylene, polyethlene, and other crystalline polyolefines, polyvinyl chloride, generally slightly plasticized, and extrudable copolymers of polyvinylidene chloride, high impact strength modified polystyrene and polycarbonates. Particularly preferred polymers are the polyamides known as nylon. The polymers may be extruded as prepolymers and subsequently polymerised during the process.

The second component must be one whose continuous structure can be destroyed when desired. It can be of the same type of polymer as the polymeric material of which the particles are formed but of different molecular weight or it can be of a different polymeric material. It can be a paste free of any polymeric material being, for example, a mixture of a lubricant and a thickening agent. It is particularly preferred to use as all or part of the second component a polyoxyethylene resin, as this is water soluble and can readily be removed by washing with water. Mixtures of the polymeric material of which the particles are formed and another polymeric material or other material may be used as the second component. Whatever is used as the second component the combination chosen for second component and polymeric material is preferably such that there is low interfacial tension between them. This is particularly important when the polymeric material is in the form of prepolymer. In general the second component will be chosen with a view to the manner in which its continuous structure is to be destroyed. If it is desired to remove the second component, by washing to leave a product consisting substantially only of the particles, then it must be one that is a removable in a suitable solvent. If it is desired to destroy the continuous structure by foaming then it must be foamable. If it is desired to destroy the continuous structure by splitting it into fibers then it must be one that is capable of being split. Preferably, in order to facilitate splitting, it should be harder than the polymeric material and should be incompatible with the latter in order that it slips easily at the interfaces. Splitting may then be achieved simply by flexing the set sheet or filamentory material or by rolling it. The splitting may be conducted so as to convert the second component into the structure generally termed split fibers, or merely to crack it away from the polymer particles sufficient to allow the material to bend.

Naturally if the polymeric material is to remain unsplit while the remainder is split then the polymeric material must be strongly resistant to splitting.

It is in any event generally preferred to include an expanding agent in the second component and to induce expansion while the particles of the sheet-like or filamentary material are still fluid. This expansion opens up the structure of the material, irrespective of whether or not the second component is retained in foam state or whether it is removed.

A particularly preferred process, applicable especially when the material is extruded in filamentory form, is one in which the particles are of nylon and the second component is of nylon mixed with polyoxyethylene. In this process after the nylon particles are set the polyoxyethylene is washed out of the second component and the nylon in the second component is then split into split fibers.

If desired some of the particles may be of one polymeric material and others of a different polymeric material. Again, some of the particles may be of one colour and others of a different colour.

The material according to the invention may be subjected to a variety of finishing treatments, depending upon their ultimate use. Often they are stretched laterally or lengthwise, or both, often while the lamellae are still soft. The stretching may conveniently be carried out under pressure by means of rollers. The open structure of the material will collapse but opens up again subsequently. Naturally the pressing must not be such that the particles are fused to one another into a continuous sheet. Another way of making a very open structure is to calender the sheet while the particles are solid but easily deformable and while the second component is very deformable, and then dissolving out the second component. The stresses introduced into the spines of the particles then make those particles open out to a bulky state, even though no expansion agent is used. In general, to make an open structure, one or more of the following processes may be used:

(1) Expansion by means of an expansion agent in the same component; (2) dissolving out at least part of the second component; (3) inducing splitting of the second component, having used as this component either a brittle polymer or one that has been weakened by swelling or other chemical treatment; or (4) by making the adhesion between the two polymers slip.

Products according to the invention may be produced at high speed. For example it is quite possible to extrude a sheet 10 cm. wide at a rate of 30 kilograms of polymeric material per hour and then to calender this sheet down to a very thin sheet, if desired. Materials according to the invention can be used for a wide variety of purposes. Thus, they may serve as textile products. These are generally produced by calendering a sheet-like material down to the desired weight and dimensions. For example, sheet-material extruded to weigh 1 kilogram per square metre may be calendered twice in each direction down to a weight of less than 500 grams per square metre, for example 100 to 200 grams per square metre. Materials as thin as 10 grams per square metre can be made by this process. When the materials are to be used as textiles the second component is generally dissolved out in its entirety or is converted into split fibers by stretching. Floor coverings, or carpets, can be made by suitable arrangement of the particles. Generally short segments standing on edge in the material are used. The second component is generally dissolved out in its entirety. Leather-like products may be made and for these the second component is generally split into split fibers. These products may be impregnated if desired with a suitable resin. For packaging or for use as building boards the second component is preferably a foamable material that is foamed and is left in the material.

I claim:

1. An extruded structure of filamentary or sheet shape formed of a coherent assembly of a multiplicity of shreds of a synthetic polymer material, each such shred having a spine of a length substantially greater than at least one of its width or thickness and a width which extends through a substantial part of the thickness of the structure, and a plurality of tentacles integral with the spine, said tentacles extending from at least one corresponding side of said spines and being collected together into at least one layer on a surface of said structure wherein the tentacles of adjacent spines are generally interlaced together to hold said shreds in said coherent assembly.

2. A structure according to claim 1 wherein a second polymeric material forms a separate phase interspersed with the shreds of the first polymeric material.

3. A structure according to claim 2 in which the phase interpersed with the shreds of the first polymeric material is of split fibers.

4. A structure according to claim 2 in which the phase interspersed with the shreds of the first polymeric material is of an expanded polymeric material.

5. A structure according to claim 1 in which the spines are arranged substantially parallel to one another and each with its length substantially parallel to the surfaces of the sheet.

6. A structure according to claim 5 in which the spines are substantially endless in length.

7. A structure according to claim 1 in which the spines are relatively short in length and are arranged substantially in parallel rows.

8. A structure according to claim 1 in which each spine extends substantially linearly and stretches substantially the width of the sheet.

9. A structure according to claim 1 in which each spine is a lamellae, having its length and width substantially greater than its thickness.

10. A structure according to claim 1 in which the tentacles are integral with a spine projecting substantially perpendicular to the length of that spine.

11. A sheet structure according to claim 1 in which tentacles are collected in layers on both surfaces of the sheet.

12. A structure according to claim 1 in which at least some of each tentacles extend from central parts of the spines through openings in adjacent shreds.

13. A structure according to claim 1 in which the tentacles are fiber-like and are felted together into a coherent assembly.

14. A structure according to claim 1 in which the tentacles are partly bonded together by means of a bonding agent.

15. A structure according to claim 1 wherein some shreds are of one polymeric material and others are of a different polymeric material.

References Cited

UNITED STATES PATENTS 3,336,174   8/1967   Dyer et al. ---------- 156—167

ROBERT F. BURNETT, Primary Examiner

R. O. LINKER, JR., Assistant Examiner

U.S. Cl. X.R.

15—62.2, 371; 161—177